United States Patent [19]

Mattei et al.

[11] Patent Number: 4,887,408
[45] Date of Patent: Dec. 19, 1989

[54] METHOD OF MANUFACTURING PACKS OF CIGARETTES WITH A HERMETICALLY SEALED WRAPPER

[75] Inventors: Riccardo Mattei; Gastone Dall'Osso, both of Bologna, Italy

[73] Assignee: G.D. Societa Per Azioni, Bologna, Italy

[21] Appl. No.: 209,320

[22] Filed: Jun. 21, 1988

[30] Foreign Application Priority Data

Jun. 23, 1987 [IT] Italy ................... 3527 A/87

[51] Int. Cl.⁴ .................. B65B 11/32; B65B 61/18
[52] U.S. Cl. ...................... 53/412; 53/463; 53/466
[58] Field of Search .............. 53/466, 234, 225, 148, 53/176, 463, 412

[56] References Cited

U.S. PATENT DOCUMENTS 3,924,386 12/1975 Schmermund ............ 53/234 X
3,948,115 4/1976 Seragnoli ............ 53/234 X
4,085,568 4/1978 Focke .................... 53/234
4,092,816 6/1978 Seragnoli .............. 53/234
4,095,396 6/1978 Seragnoli .............. 53/234
4,208,854 6/1980 Seragnoli .............. 53/234

Primary Examiner—John Sipos
Attorney, Agent, or Firm—Cushman, Darby & Cushman

[57] ABSTRACT

Groups of cigarettes are inserted in succession into the peripheral pockets of an indexed wrapping wheel, each together with a relative sheet of heat-sealable wrapping material that incorporates a tear-open strip to facilitate the operation of breaking open the pack; the sheet is folded initially to create a sheath, enveloping the group of cigarettes lengthwise, the overlapping flaps of which are fused together by heat-seal elements that operate each time the wheel pauses; the projecting ends of the sheet are then folded down over the top and bottom of the pack by an assembly of mechanisms, and fused together by further heat-seal elements.

3 Claims, 2 Drawing Sheets

METHOD OF MANUFACTURING PACKS OF CIGARETTES WITH A HERMETICALLY SEALED WRAPPER

BACKGROUND OF THE INVENTION

The invention disclosed relates to a method of manufacturing packs of cigarettes provided with a hermetically sealed wrapper.

Conventional cigarette packagings comprise an inner wrapper of paper, faced on one side with a sheet of tin foil (silver paper), and an outer wrapper which consists of paper, in the case of crush packs, or of a cardboard box in the case of flip-top rigid packs with a hinged lid. The outer wrapper is enveloped in its turn by a covering of transparent, substantially airtight material, the overlapping edges of which are bonded or heat-sealed together. Such a covering is sufficient, in most instances, to guarantee the cigarettes adequate protection against damp, and to afford a measure of insulation from the surrounding environment such as will maintain their organoleptic properties intact.

It has been discovered, however, that for cigarettes of especially aromatic flavor, or those destined for a long shelf life in hot or humid climates, the protection afforded by a covering and wrappers as described above will not suffice to ensure that the properties of the cigarettes remain unaffected in the long term.

Cigarette packaging machines currently available on the open market are incapable of producing packs with a faultlessly hermetic seal.

The object of the invention is to provide a method of manufacturing a wrapper such as will ensure a complete isolation of the packaged cigarettes from the surrounding environment.

SUMMARY OF THE INVENTION

According to the invention, packs of cigarettes can be manufactured with a hermetically sealed wrapper by adoption of a method comprising certain essential steps. First, a group of cigarettes is introduced, together with a sheet of heat-sealable wrapping material, into the pocket of an indexed wrapping wheel, both being maintained in position internally of the pocket by initial retention means. The sheet of wrapping material is then folded into a sheath around the cigarettes, the two overlapping flaps of the sheath being held in position until the point is reached where they are fused together at first heat-sealing stations. Next, the projecting open ends of the sheath are folded in to form the top and bottom of the pack, held in position, and fused at second heat-sealing stations. Finally, the finished wrapper is ejected from the pocket.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
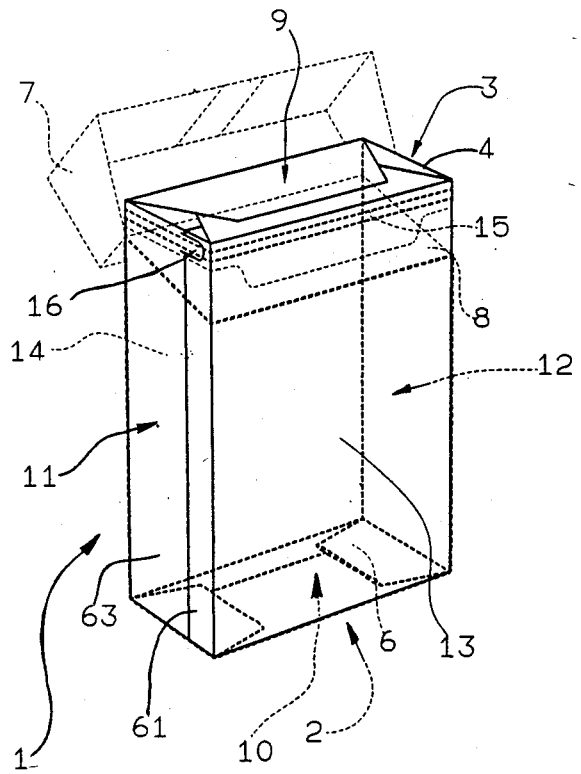
FIG. 1 is the perspective of a pack of cigarettes manufactured using a packaging machine capable of implementing the method disclosed.
Figure 2:
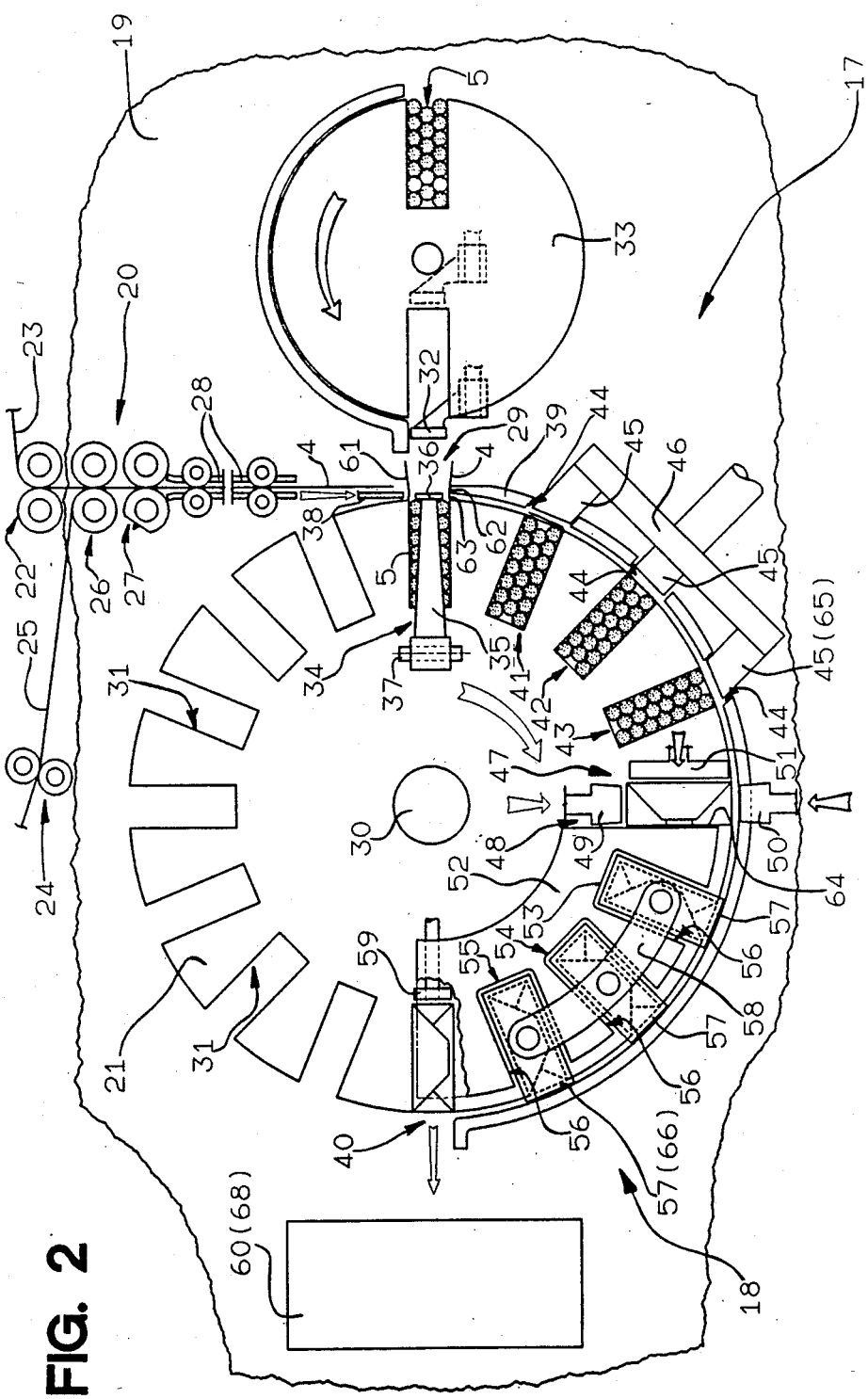
FIG. 2 is the schematic representation of a packaging machine designed to implement the method disclosed, viewed in side elevation.

With reference first to FIG. 1 of the drawings, 1 denotes a pack of cigarettes, in its entirety. The pack 1 is a rigid flip-top type having a hinged lid, consisting essentially in an outer box 2, and internally of the box, a wrapper 3 fashioned from a sheet 4 of floppy material that envelops a group of cigarettes, arranged in side-by-side formation and denoted 5 (FIG. 2). The wrapper 3 is embodied in a heat-sealable and highly flexible plastic material possessing optimum properties of imperviousness to air and moisture.

The outer box 2 comprises a hollow element 6 of substantially parallelepiped shape, a lid 7 hinged to the top edge of one of the two larger walls of the hollow element 6, and an internal element or collar 8, in cardboard, located between an upper frontal section of the hollow element 6 and an upper frontal section of the wrapper 3.

9 and 10 denote the top and bottom of the wrapper 3; the two longitudinal sides are denoted 11 and 12, and the front and rear faces 13 and 14. Once folded, the wrapper 3 is sealed across the top and bottom 9 and 10, and along one side 11.

The wrapper 3 incorporates a tear-open strip 15 of conventional type, affording a tab 16 located adjacent to the top 9 of the pack, that facilitates the operation of breaking open the wrapper.

Referring to FIG. 2 of the drawings, 17 denotes a cigarette packaging machine, in its entirety, which incorporates apparatus 18 for the manufacture of the aforementioned inner wrappers 3; the apparatus 18 in question is carried by a side wall 19 of the machine and comprises a feeder unit 20 by which the wrapping material is supplied, and a wheel 21 which fashions the single wrappers 3.

The feeder unit 20 comprises means 22 for the supply of a continuous strip of wrapping material 23, and means 24 for the infeed of a continuous narrow strip of adhesive material 25. The two strips 23 and 25 are conveyed as one into a bonding unit 26, by which the adhesive strip 25 is applied to one edge of the wrapping strip 23 in conventional fashion. A further unit 27, located downstream of the bonding unit 26, serves to cut the continuous bonded strip 23-25 into discrete sheets 4 which are fed singly through guide means 28 to the infeed station 29 of the wrapping wheel 21.

The wrapping wheel 21 is supported and indexed in the clockwise direction by a shaft 30 journalled to the wall 19 of the machine, and exhibits a plurality of pockets 31 spaced apart at equal distance around its periphery, each of which designed to accept one group 5 of cigarettes and a relative sheet 4 of the wrapping material; there are sixteen such pockets in the example illustrated. 32 denotes a horizontally disposed reciprocating pusher, positioned alongside the infeed station 29, each forward stroke of which transfers a group 5 of cigarettes and one wrapping sheet 4 into a respective pocket 31 of the wheel 21, waiting at standstill. The groups 5 of cigarettes are inserted into and ejected from the pockets of a transfer wheel, denoted 33, positioned adjacent to the wrapping wheel 21; the transfer wheel 33 is of a type disclosed in U.S Pat. No. 4,095,396, property of the same applicant.

The apparatus comprises a retention device, likewise situated alongside the infeed station 29, comprising two fence elements 34 (one only of which is visible in FIG.

2), each offered to a respective side of the wheel 21. Each fence element comprises an arm 35, occupying what is substantially a radial position in relation to the wrapping wheel 21; the end of the arm 35 nearest the periphery of the wheel 21 carries a plate 36, whilst its remaining end is hinged to a vertical pivot 37.

Each arm 35 is associated with actuator means (not illustrated) designed to produce a swinging movement, within a radial plane of the wheel 21, such as will shift the relative plate 36 between a first position, in which the wheel 21 is at standstill and a group 5 of cigarettes cradled inside the pocket 31 currently occupying the infeed station 29, and a second position in which the arm 35 is distanced from the pocket 31.

The infeed station 29 further accommodates a folding member, embodied as a reciprocating upright plate 38 which occupies a plane substantially tangential to the wheel 21 and is operated by relative actuator means (not illustrated).

39 denotes a fender breasted in fixed position with the cylindrical face of the wheel 21, which extends through an arc of 180° or thereabouts from a point immediately downstream of the infeed station 29 to an eject station 40, located diametrically opposite the infeed point, where he packs 1 leave the wheel.

41, 42 and 43 denote three successive stations at which the pockets 31 are made to pause, located downstream of the infeed station 29 and referred to in the following pages as first heat-seal stations.

The fender 39 exhibits three windows 44, aligned with the three stations 41, 42 and 43, affording passage to three heat-seal elements 45 fitted to a common holder 46 which is reciprocated by actuator means (not illustrated) through a radial direction, considered in relation to the wheel 21, to the end of bringing the heat-seal elements 45 up against the pockets 31 when the wheel 21 is at standstill.

47 denotes a fold station located immediately beyond the third 43 of the first heat-seal stations, at 90° from the infeed station 29, where two sets of folding means 48 operate in concert; such means 48 are breasted with each side of the wheel 21 (one set only can be seen in FIG. 2), and serve to fold the top and bottom ends 9 and 10 of each wrapper 3. Each set of folding means 48, operating on the top 9 and bottom 10 of the wrapper respectively, comprises two folding members 49 and 50 that are reciprocated simultaneously by actuator means (not illustrated) through mutually opposite radial directions within the plane occupied by the relative side face of the wheel 21. The set of folding means 48 on each side of the wheel 21 further comprises a folding member denoted 51, associated with relative actuator means (not illustrated) by which it is reciprocated in a direction at right angles to that of the two radial folding members 49 and 50, likewise within the plane occupied by the side face of the wheel 21.

The two side faces of the wheel 21 downstream of the fold station 47 are flanked by retaining means that consist in two fixed guides 52 of quadrant shape extending through an arc of 90° or thereabouts, from the fold station around to the eject station 40.

53, 54 and 55 denote three successive stations at which the pockets 31 are made to pause, located downstream of the fold station 47 and referred to in the following pages as second heat-seal stations. Both guides 52 exhibit three windows 56, aligned with the three stations, affording passage to three respective heat-seal elements 57 fitted to common holders 58, one at each side, which are reciprocated by actuator means (not illustrated) through a path parallel to the axis of rotation of the wheel 21.

59 denotes a pusher identical to that denoted 32, which operates at the eject station 40 and serves to transfer the single wrappers 3 from the pockets 31 to a further machine unit 60, say, a wrapping unit of the type disclosed in U.S Pat. No. 4,208,854 (property of the same applicant), which finishes the packs 1 by inserting the filled wrappers 3 in their cardboard boxes 2.

In operation, every time the wrapping wheel 21 is at standstill, a group 5 of cigarettes is transferred by the pusher 32 into the pocket 31 occupying the infeed station 29, accompanied by a wrapping sheet 4 with its bonded tear-open strip 15. More precisely, the full forward stroke of the pusher 32 drives the group 5 of cigarettes completely into the pocket 31, folding the sheet 4 into a "U" shape with the flaps destined to form the side 11, top 9 and bottom 10 of the wrapper projecting from the wheel 21. Before the pusher 32 is retracted, the two elements 34 of the retention device will operate to prevent the cigarettes escaping from the pocket 31, the two plates 36, hitherto distanced from the opening of the pocket 31, being swung inward to the position whereby the group 5 of cigarettes is safely cradled. The pusher 32 having been retracted, the upright plate 38 descends, and the topmost flap 61 of the wrapping sheet 4 projecting radially from the wheel 21 is folded down over the corresponding side of the group 5 of cigarettes: meanwhile, the fence elements 34 are distanced from the cigarettes, swung away on their respective pivots 37.

The wheel 21 is now indexed through one step, during which the entry lip 62 of the fender 39 acts as a fixed folding member by pressing the lower radially projecting flap 63 of the sheet 4 over the flap 61 already folded. In addition to folding, the fender performs a retaining function by preventing the group 5 of cigarettes from leaving the pocket 31 and keeping the two flaps 61 and 63 flattened; thus, the upright folding plate 38 is no longer required, and can withdraw to its at-rest position.

The wrapping sheet 4 having now been folded round the cigarettes into a sheath, the pack in formation is made to pause at each one of the first heat-seal stations 41, 42 and 43 in succession, and the three relative heat-seal elements 45 will impinge upon the overlapping flaps 61 and 63, fusing them together.

On arrival of the pack at the fold station 47, the radial folding members 49 and 50 at each side of the wheel draw together and flatten the two end flaps of the sides 11 and 12 that project from the pocket 31 at either side, folding them against the ends of the cigarettes. Before these members 49 and 50 retract, the remaining members 51 will advance and fold the two projecting flaps of the front 13 of the wrapper; it is the front face 13 of the wrapper that occupies the trailing position, in relation to the movement of the wheel 21.

The wheel 21 will index another step before the two folding members 51 retract, during the course of which the entry lip 64 of each quadrant 52 effects a fold by flattening the flaps projecting from the rear face 14 (the leading face, in relation to the movement of the wheel), thereby completing the top and bottom of the wrapper, 9 and 10 respectively. With the folding operations completed in the manner thus described, the pack is conveyed successively through each of the second heat-seal stations 53, 54 and 55; the relative heat-seal elements 57 operate at each station, fusing the flaps of the top 9 and bottom 10 of the wrapper 3.

When the wrapped cigarettes occupying the single pockets 31 finally arrive at the eject station 40, the relative pusher 59 will effect the transfer from the wheel 5 to the unit denoted 60, where each pack 1 is finished by enveloping the wrapper 3 and its contents in a box 2 as described above.

Figure 3:
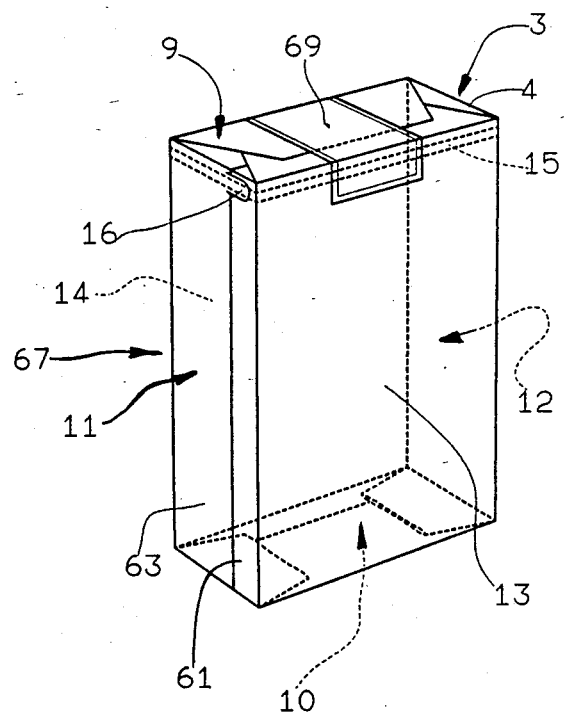
FIG. 3 is the perspective of a pack of cigarettes manufactured by the packaging machine of FIG. 2.

In the event that it is the soft, crush-type pack 67 being manufactured (see FIG. 3), the wrapping unit 60 may incorporate a conventional device 68 for the application of a printed seal 69 to each pack 67. It will be observed that a crush pack 67 according to the invention has the advantage over conventional crush packs, not only of being hermetic, but also of lower cost, as one wrapper is used instead of the usual two.

From the foregoing description, it will be seen that the apparatus 18 disclosed permits fashioning a hermetically sealed wrapper 3 in direct contact with the commodity that it envelops, and notably, particularly delicate commodities such as cigarettes. Also, the highly flexible properties of the wrapping material are offset by the various retaining means, which prevent the folded flaps from springing up. Such a retaining action is provided by the upright plate 38, the fender 39, the folding members 49, 50 and 51, and the quadrant guides 52; all these serve to hold the different flaps in the folded position until the relative heat-seal operations have been accomplished.

Needless to say, numerous variations may be made to the apparatus disclosed without straying from the scope of the invention, the basic principle of which remains the same. For example, should there be any risk that cigarettes enveloped by the wrappers 3 become subject to considerable heat for substantial durations, the heat-seal elements 45 and 57 at the final station of each set, i.e. 43 and 55, could be replaced by cooling elements, denoted 65 and 66.

What is claimed:

1. A method of manufacturing a pack of cigarettes with a hermetically sealed wrapper, comprising the steps of:
    (a) introducing a group of cigarettes, together with a sheet of heat-sealable wrapping material, into a pocket of an indexed wrapping wheel;
    (b) maintaining the group of cigarettes and the relative sheet of wrapping material in position internally of the pocket, using an initial retention element;
    (c) folding the sheet of wrapping material into a sheath peripherally around the group of cigarettes, using first fixed and movable folding elements, so that the sheath has two overlapping flaps and two open ends which project axially beyond respective ends of the cigarettes;
    (d) holding the two overlapping flaps of the sheath of wrapping material correctly positioned, using a first fixed retaining element and while so doing, fusing together the two overlapping flaps of the sheath using a first heat-sealing element so that the sheath forms a tube open at both ends;
    (e) folding-in the projecting open ends of the sheath to form the top and bottom ends of the wrapper, using second fixed and movable folding elements;
    (f) holding the top and bottom end folds correctly positioned, using a second fixed retaining element and while so doing, fusing the top and bottom folds, using second heat-sealing elements to provide a hermetically sealed finished wrapper; and
    (g) ejecting the finished wrapper from the pocket of the indexed wrapping wheel.

2. A method as in claim 1, comprising the additional step of: cooling the wrapper following at least one of the heat-sealing steps, using cooling elements.

3. A method as in claim 1, wherein the sheet of heat-sealable wrapping material as introduced into said pocket is provided with a tear-open strip to facilitate breaking open the wrapper in use.

* * * * *